United States Patent
Beeston et al.

(10) Patent No.: US 8,239,570 B2
(45) Date of Patent: Aug. 7, 2012

(54) USING LINK SEND AND RECEIVE INFORMATION TO SELECT ONE OF MULTIPLE LINKS TO USE TO TRANSFER DATA FOR SEND AND RECEIVE OPERATIONS

(75) Inventors: Ralph Thomas Beeston, Tucson, AZ (US); Thomas William Bish, Tucson, AZ (US); Joseph Whitney Dain, Vail, AZ (US); Jonathan Wayne Peake, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 12/243,957

(22) Filed: Oct. 1, 2008

(65) Prior Publication Data

US 2010/0082840 A1  Apr. 1, 2010

(51) Int. Cl.
*G06F 15/16* (2006.01)
*G06F 15/173* (2006.01)
(52) U.S. Cl. ......................... 709/238; 709/235
(58) Field of Classification Search .......... 709/230–242, 709/203, 217–219
See application file for complete search history.

(56) References Cited

U.S. PATENT DOCUMENTS

| | | | | |
|---|---|---|---|---|
| 5,936,940 A * | 8/1999 | Marin et al. | | 370/232 |
| 6,904,017 B1 | 6/2005 | Meempat et al. | | |
| 7,028,094 B2 | 4/2006 | Le et al. | | |
| 7,266,079 B2 | 9/2007 | Fan | | |
| 7,317,711 B2 * | 1/2008 | Bae et al. | | 370/335 |
| 7,633,869 B1 * | 12/2009 | Morris et al. | | 370/232 |
| 2002/0196752 A1 * | 12/2002 | Attar et al. | | 370/331 |
| 2002/0197997 A1 * | 12/2002 | Attar et al. | | 455/446 |
| 2003/0125037 A1 * | 7/2003 | Bae et al. | | 455/450 |
| 2004/0152422 A1 * | 8/2004 | Hoglund et al. | | 455/67.11 |
| 2005/0169301 A1 * | 8/2005 | Jain et al. | | 370/464 |
| 2006/0069800 A1 * | 3/2006 | Li | | 709/232 |
| 2006/0109787 A1 * | 5/2006 | Strutt et al. | | 370/235 |
| 2007/0064605 A1 | 3/2007 | Ho et al. | | |
| 2007/0153687 A1 * | 7/2007 | Attar et al. | | 370/229 |
| 2008/0247317 A1 * | 10/2008 | Weil et al. | | 370/237 |
| 2009/0013175 A1 * | 1/2009 | Elliott | | 713/154 |
| 2010/0062773 A1 * | 3/2010 | Yokota | | 455/437 |
| 2010/0274872 A1 * | 10/2010 | Harrang et al. | | 709/217 |

(Continued)

OTHER PUBLICATIONS

Y. Bejerano, et al., "Fairness and Load Balancing in Wireless LANs Using Association Control", ACM, 2004, pp. 315-328.

(Continued)

*Primary Examiner* — Asad Nawaz
(74) *Attorney, Agent, or Firm* — David W. Victor; Konrad Raynes & Victor L.L.P.

(57) ABSTRACT

Link information for a plurality of links to at least one target node indicates for each link a send throughput for sending data, a receive throughput for received data, a slate of the link indicating whether the link is online, offline or degraded. The send throughput of the links having the online state is processed to select one of the links to the receiving node in response to determining that more than one of the links has the online state. The data of the send operation is sent using the selected link to the receiving node. The receive throughput is processed to select one of the links having the online state to the sending node in response to determining that more than one of the links has the online state. The data of the receive operation is received using the selected link to the sending node.

20 Claims, 6 Drawing Sheets

U.S. PATENT DOCUMENTS

2011/0103495 A1* 5/2011 Hall .............................. 375/260

OTHER PUBLICATIONS

C.C. Ho, et al., "A Scalable Framework for Wireless Network Monitoring", ACM, 2004, pp. 93-101.

T. Bjerregaard, et al., "A Survey of Research and Practices of Network-on-Chip", ACM Computing Surveys, vol. 38, Mar. 2006, Article 1.

Y. Bejerano, et al., "Fairness and Load Balancing in Wireless LANs Using Association Control", IEEE/ACM Transactions on Networking, vol. 15, No. 3, Jun. 2007, pp. 1-14.

* cited by examiner

USING LINK SEND AND RECEIVE INFORMATION TO SELECT ONE OF MULTIPLE LINKS TO USE TO TRANSFER DATA FOR SEND AND RECEIVE OPERATIONS

BACKGROUND OF THE INVENTION

1. Field of the Invention

The present invention relates to a method, system, and article of manufacture for using link send and receive information to select one of multiple links to use to transfer data for send and receive operations.

2. Description of the Related Art

Host systems in a storage network may communicate with a node through multiple paths. The node may be comprised of separate storage clusters or nodes, where each storage cluster is capable of accessing the storage and provide redundancy to access the storage. Hosts may access the attached storage through either cluster. If a storage cluster fails, then the host may failover to using the other storage cluster to access the storage.

The host systems have to select a link or path to use to communicate with another host. One prior art solution is to use round robin load balancing algorithms that try to balance the amount of work even on each link. However, round robin balancing technique may fail to detect and report that throughput on a link is less capable than another link or is degraded, and may also fail to properly balance workloads under certain conditions because data transfer tasks take longer on links having lower data throughput. For instance, if a more capable link is completing work faster, the round robin load balancing algorithm may just as likely select a worse performing link over a better performing link In this way, using a round robin method may result in work backing-up on the slower performing link due to the 50-50 distribution, whereas the better performing link would drain quickly and the number of tasks would grow on the slower link, eventually putting all but an occasional single task on the faster link.

There is a need in the art for improved techniques to select one of multiple links to use to communicate between nodes.

SUMMARY

Provided are a method, system, and article of manufacture for using link send and receive information to select one of multiple links to use to transfer data for send and receive operations. Link information for a plurality of links to at least one target node indicates for each link a send throughput for sending data, a receive throughput for received data, a state of the link indicating whether the link is online, offline or degraded. A send operation is processed to transfer data to a receiving node comprising one of the target nodes. A determination is made of the states of the links to the receiving node in response to the send operation. The send throughput of the links having the online state is processed to select one of the links to the receiving node in response to determining that more than one of the links has the online state. The data of the send operation is sent using the selected link to the receiving node. A retrieve operation to access data from a sending node comprising one of the target nodes is processed. A determination is made of the state of the links to the sending node in response to the retrieve operation. The receive throughput is processed to select one of the links having the online state to the sending node in response to determining that more than one of the links has the online state. The data of the receive operation is received using the selected link to the sending node.

DETAILED DESCRIPTION

Figure 1:
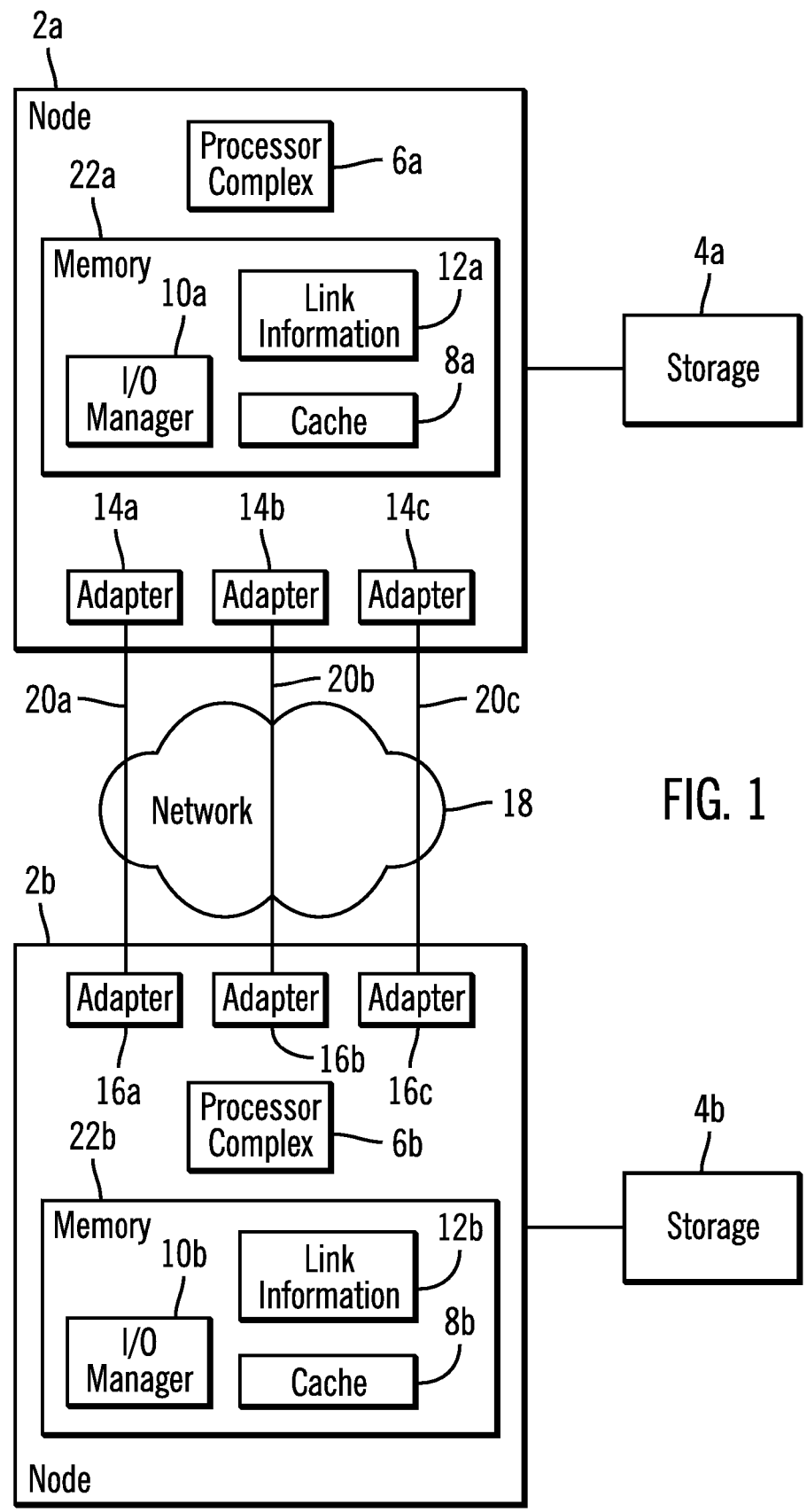
FIG. 1 illustrates an embodiment of a computing environment.

FIG. 1 illustrates an embodiment of a network computing environment. Nodes 2a, 2b manage access to their respective attached storages 4a, 4b. The nodes 2a, 2b may communicate data, such as I/O requests, packets, messages and other information, to each other. The nodes 2a, 2b each include a processor complex 6a, 6b, a cache 8a, 8b to cache data, an I/O manager 10a, 10b to manage the execution and transmission of I/O requests, and link information 12a, 12b on performance and workload on links connecting the nodes. The nodes 2a, 2b include one or more adapters 14a, 14b, 14c and 16a, 16b, 16c to enable communication over a network 18. The network 18 may comprise one network or multiple networks, such as interconnected heterogeneous networks. The nodes 2a, 2b include a computer memory 22a, 22b to store the link information 12a, 12b, I/O manager 10a, 10b code that is executed by the processor complex 6a, 6b and the cache 8a, 8b.

Each adapter 14a, 14b, 14c, 16a, 16b, 16c provides one or more links 20a, 20b, 20c between the nodes 2a, 2b. A link 20a, 20b, 20c may comprise a logical link and there may be multiple logical links over a single physical one. Alternatively, a link 20a, 20b, 20c may refer to a physical link. Although two nodes 2a, 2b are shown there may be links that extend among more than two nodes, such as a link extending through three or more nodes. The links 20a, 20b, 20c may comprise physical connections or logical connections through a same physical line.

An initiating node 2a or 2b may initiate a send operation, such as a write or mirror operation, to send data to a target node and a receive operation, such as a read, to cause the target node to transfer data to the initiating node.

The I/O manager 10a, 10b may be implemented as code maintained in a computer memory executed by a processor complex 6a, 6b. Alternatively, the I/O manager 10a, 10b may be implemented as a hardware device, such as an application specific integrated circuit (ASIC). Yet further, the I/O manager 10a, 10b may be implemented and execute external to the adapters 14a, 14b, 14c or within adapter hardware. In the embodiment where the I/O manager 10a, 10b is implemented as a hardware device, the link information 12a, 12b may be stored within such hardware device or in an external computer memory.

Figure 2:
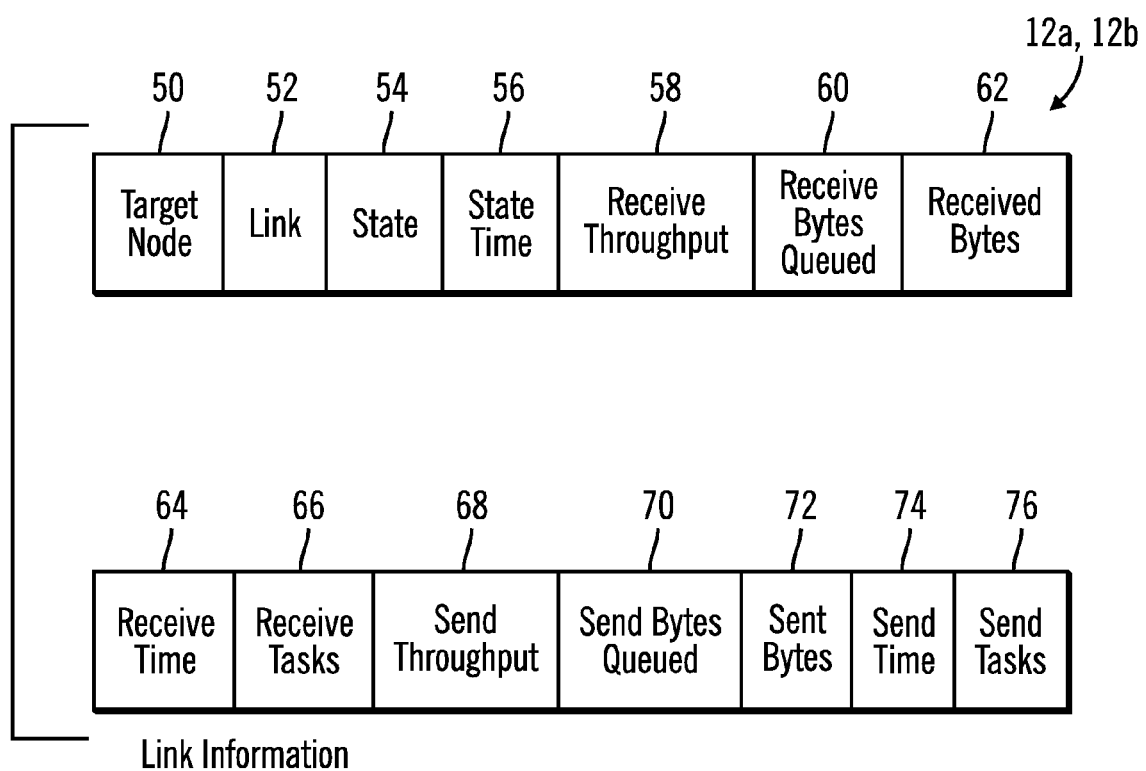
FIG. 2 illustrates an embodiment of link information.

FIG. 2 shows the link information 12a, 12b maintained by each node 2a, 2b, including:

Target node 50: identifying the node 2a, 2b to which the link 20a, 20b, 20c connects.

Link 52: an identifier of the link 20a, 20b, 20c for which the information is provided, and may include a network address of the link.

State 54: indicating a state of the link 52, such as degraded, online or offline. A link may be offline if it is in a state where it cannot be used, such as completely down.

State time 56: indicating a time the state 54 of the link 52 was last changed Receive throughput 58: indicating a throughput for receiving data, e.g., megabytes per second (MB/sec), for the link 52 for all receive tasks queued on the link 52, where multiple receive tasks may be queued on the link 52 to receive data from the target node 50, which comprises a sending node.

Receive bytes queued 60: a number of bytes queued to be received on the link 52 from the target node 50 for all receive tasks pending on the link 52.

Received bytes 62: bytes received on the queue since the last time the receive throughput 58 was calculated/recalculated.

Receive time 64: a timestamp of a time the receive throughput 58 was last calculated/recalculated.

Receive tasks 66: a number of receive tasks pending at the link 52 to receive, e.g., read, data from the target node 50, which is the sending node.

Send throughput 68: indicating a throughput for sending data, e.g., megabytes per second (MB/sec), for the link 52 for all send tasks queued on the link 52, where multiple send tasks may be queued on the link 52 to send data to the target node 50, which is the receiving node.

Send bytes queued 70: a number of bytes queued to be sent on the link 52 to the target node 50 for all send tasks pending on the link 52.

Sent bytes 72: bytes sent on the queue since the last time the send throughput 68 was calculated/recalculated.

Send time 74: a timestamp of a time the send throughput 68 was last calculated/recalculated.

Send tasks 76: a number of send tasks pending at the link 52 to send, e.g., write, mirror, etc., data to the target node 50, which is the receiving node.

FIGS. 3, 4, 5, 6, and 7 illustrate operations performed by the I/O manager 10a, 10b to maintain link information 12a, 12b used to select a link to use for send and receive operations. The operations performed in FIGS. 3-6 may be performed by send and receive tasks invoked by the I/O manager 10a, 10b, where a send/receive task is initialized to handle a particular send/receive operation. The description of operations with respect to a receive/send element or information indicates that the flow of operations apply to one of the send and receive related operations. For instance, indicating receive/send throughput in the operations, indicates that the receive or send throughput is considered depending on whether the operation is a send or receive.

Figure 3:
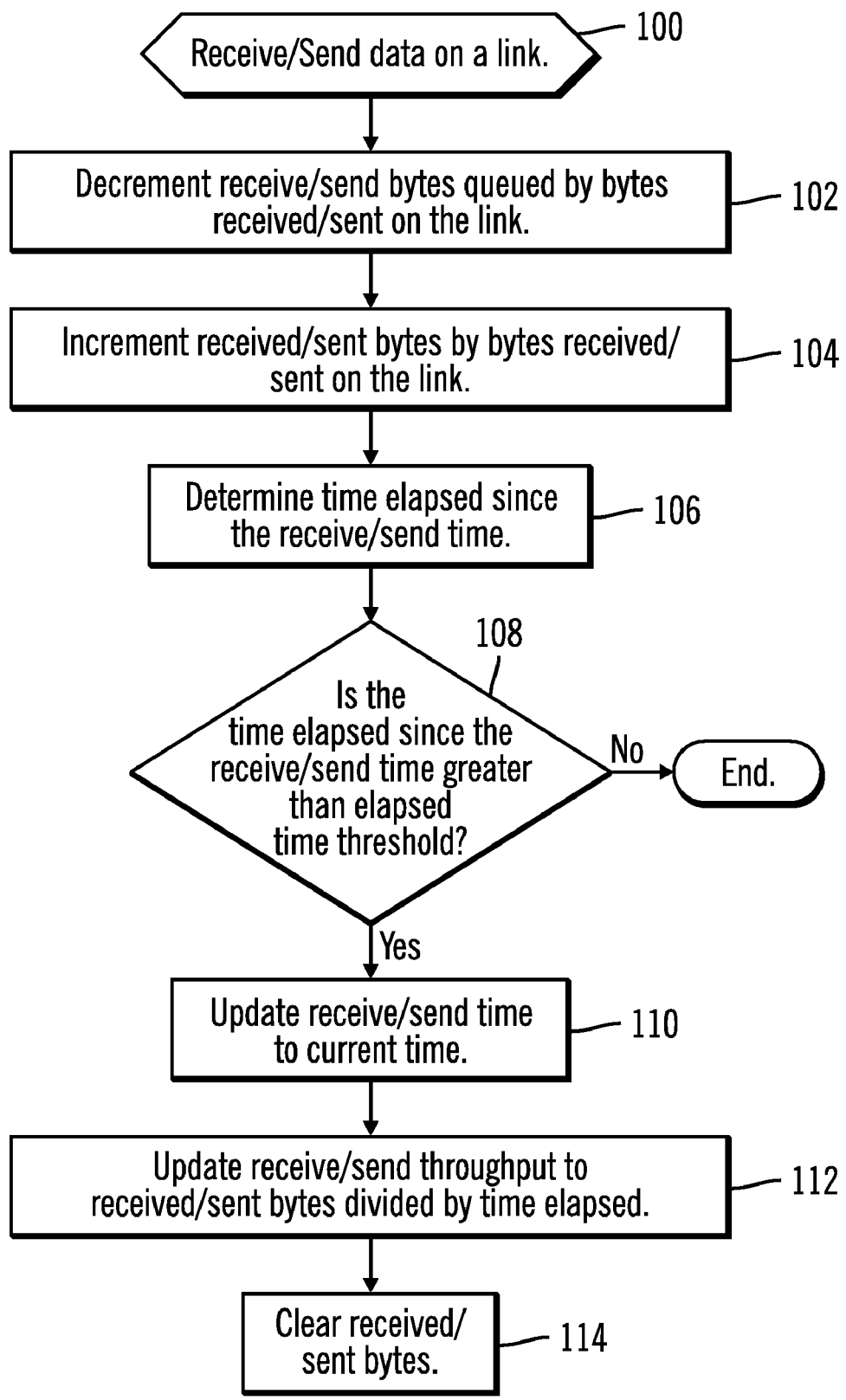
FIG. 3 illustrates an embodiment of node operations update link information.

FIG. 3 illustrates an embodiment of operations performed by a send/receive task within the I/O manager 10a, 10b to update link information 12a, 12b. Upon completing an operation to receive/send data (at block 100) on a link 20a, 20b, 20c, the I/O manager 10a, 10b decrements (at block 102) the receive 60/send 70 bytes queued to indicate that bytes queued for the operation have been transferred as part of the operation. The received 62/sent 72 bytes are incremented (at block 104) by the bytes received/sent on the link 20a, 20b, 20c. The I/O manager 10a, 10b determines (at block 106) the time elapsed since the receive 64/send 74 time, which is the time elapsed since the send/receive link information 12a, 12b was last updated. If (at block 108) the time elapsed since the last update is greater (at block 108) than an elapsed time threshold, then the I/O manager 10a, 10b updates (at block 110) the receive 64/send 74 time to the current time and updates (at block 112) the receive 58/send 68 throughput to the received 62/sent 72 bytes (which is the bytes received/sent since the received/sent link information was last updated) divided by the time elapsed. The received 62/sent 72 bytes are then cleared (at block 114). If (at block 108) the time elapsed since the last time the receive/send information was updated is less than the elapsed time threshold, then control ends without updating the receive/send link information. In certain embodiments, the updated link information may be subject to data smoothing and filtering.

Figure 4:
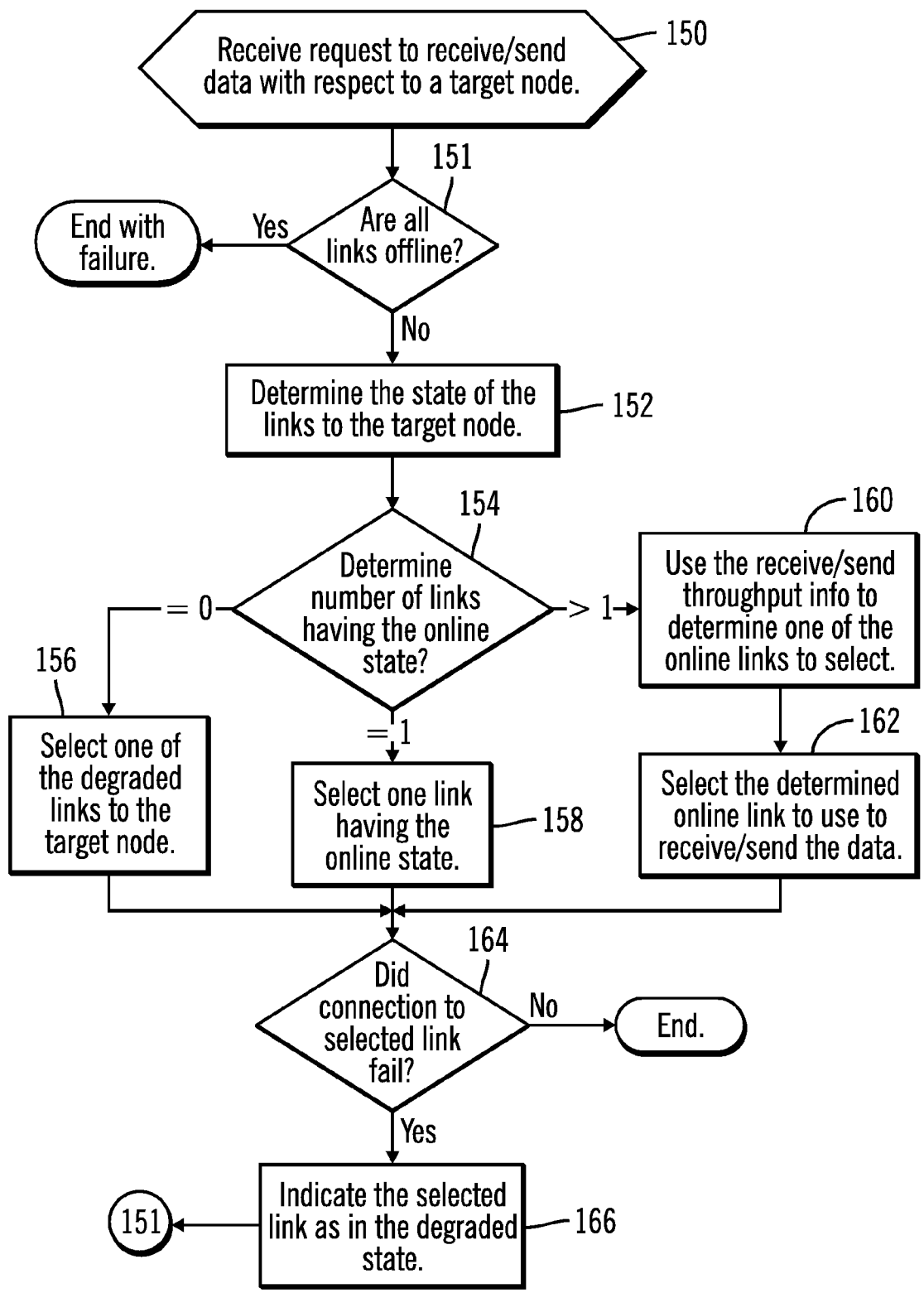
FIG. 4 illustrates an embodiment of node operations to select a link.

FIG. 4 illustrates an embodiment of operations performed by a receive/send task to the I/O manager 10a, 10b to select a link 20a, 20b, 20c. Upon receiving (at block 150) a request to receive/send data with respect to a target node, if (at block 151) all the links 20a, 20b, 20c are in the offline state, then failure is returned and a link cannot be selected. If (at block 151) there is at least one available degraded or online link, then the I/O manager 10a, 10b determines (at block 152) the state 54 of the links 20a, 20b, 20c to the target node and determines (at block 154) the number of links having an online state. If (at block 154) there is no link having the online state, i.e., they all are in the degraded state, then the I/O manager 10a, 10b selects (at block 156) one of the degraded links 20a, 20b, 20c to the target node. If (at block 154) there is only one online link to the target node, then that online link is selected (at block 158) to use for the transfer. If (at block 154) there are multiple online links 20a, 20b, 20c, the send/receive selects (at block 160) uses the receive 58/send 68 throughput information to select one of the online links 20a, 20b, 20c to the target node to use to receive/send the data. From blocks 156, 158 and 162, if (at block 164) the selected link 20a, 20b, 20c fails, then the I/O manager 10a, 10b indicates (at block 166) the state 54 of the selected and tried link 20a, 20b, 20c as in the degraded state and control proceeds back to block 151 to try to select another online or degraded link to use. If (at block 164) the selected link does not fail, then control ends with success.

In one embodiment, the I/O manager 10a, 10b uses the receive 58/send 68 throughput to select one of the online links 20a, 20b, 20c by selecting the online link having the highest receive 58/send 68 throughput. In an additional embodiment, the receive 58/send 68 throughput may be used by determining the potential time of the online links 20a, 20b, 20c to complete a data transfer. The potential time of a link may comprise the potential time to transfer the data for the new receive/send task given the current per task throughput on each link 20a, 20b, 20c. The online link having the lowest potential time to transfer the data for its tasks may then be selected. The current per task throughput for a link may comprise the receive 58/send 68 throughput divided by the number of receive 66/send 76 tasks pending for the link. For instance, the potential time for a link 20a, 20b, 20c to complete a transfer may comprise:

(receive 60/send 70 bytes queued+the new bytes to receive/send)/(receive 58/send 68 throughput/ receive 66/send 76 tasks).

Figure 5:
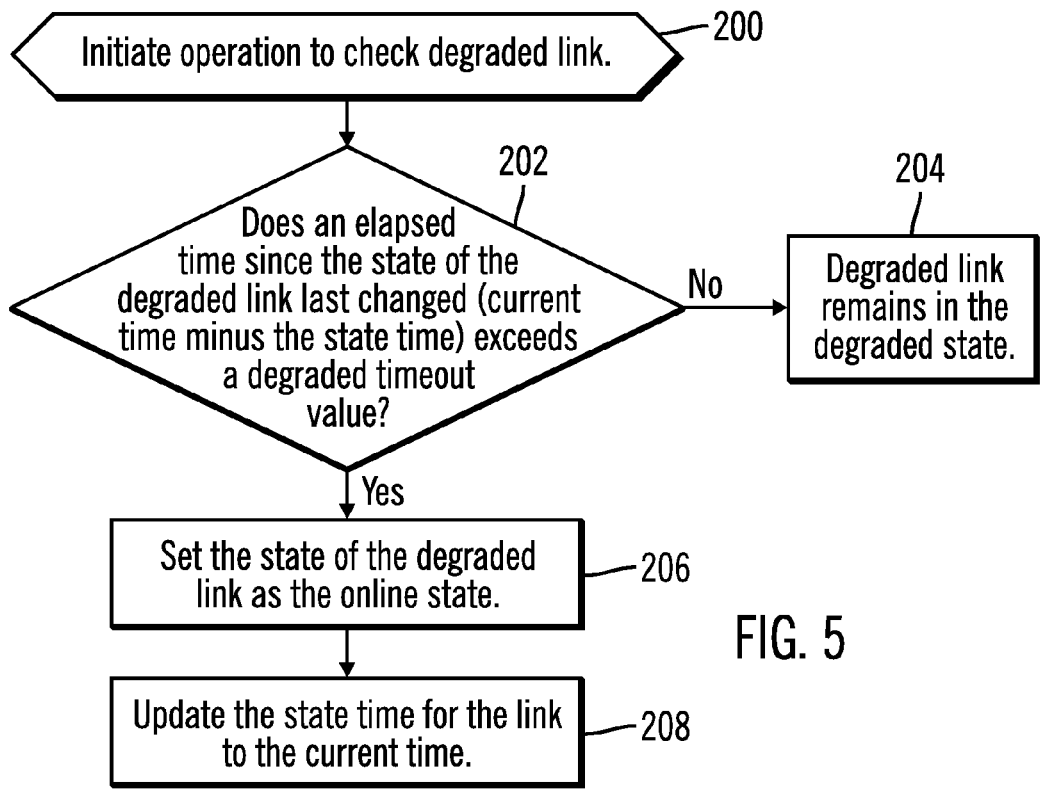
FIG. 5 illustrates an embodiment of node operations to determine whether to change the link state for a degraded link.

FIG. 5 illustrates an embodiment of operations performed by the I/O manager 10a, 10b to check whether a link 20a, 20b, 20c having a state 54 of degraded should be changed to being online. Upon initiating (at block 200) the check operation, the I/O manager determines whether an elapsed time since the state 54 of the degraded link last changed (current time minus the state time 56) exceeds a degraded timeout value. If not (at block 204), i.e., the link has not been degraded a sufficient time, then the state 54 of the degraded link 20a, 20b, 20c remains in the degraded state. Otherwise, if (at block 202) the link has been in the degraded state for more than the degraded timeout value, then the state 54 of the degraded link 20a, 20b, 20c is set (at block 206) to online and the state time 56 is updated to the current time to indicate the new time of the update to the state 54.

With the described embodiment of FIG. 5, a link remains degraded for a limited time before being set back to the online state.

Figure 6:
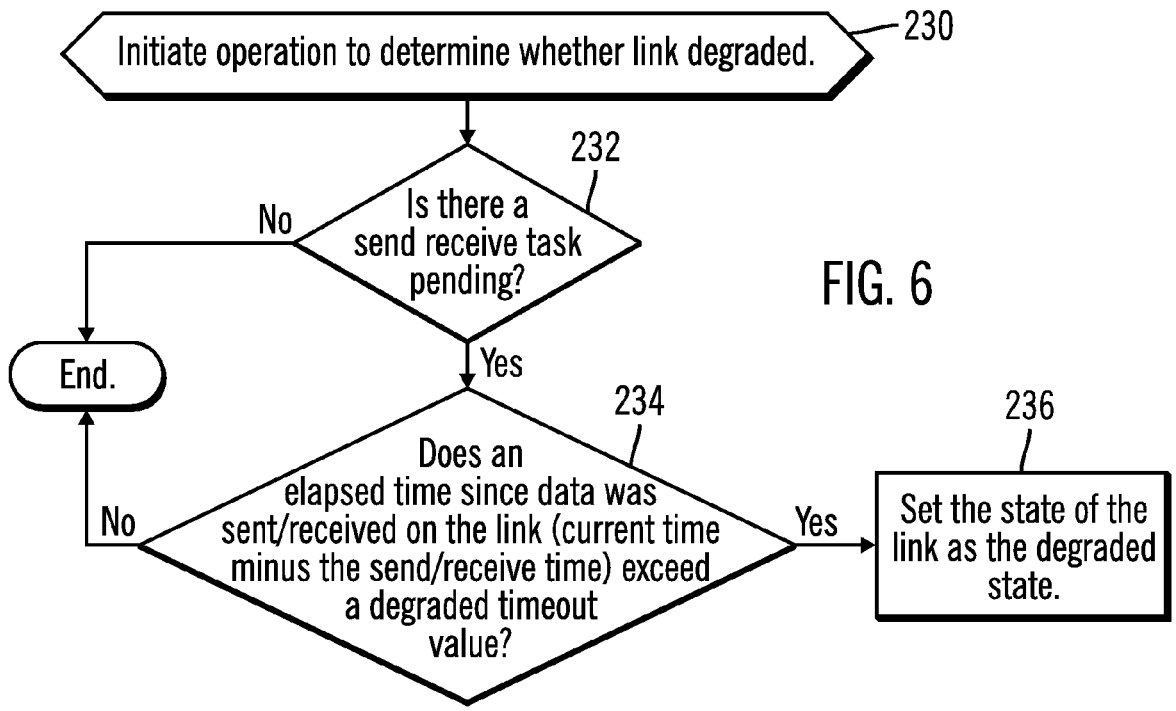
FIGS. 6 and 7 illustrate embodiments of node operations to determine whether to change the link state to degraded.

FIG. 6 illustrates an embodiment of operations performed by the I/O manager 10a, 10b send and receive tasks to determine whether an online link is degraded. Upon initiating (at block 230) the operation to determine whether a link 20a, 20b, 20c is degraded, the I/O manager 10a, 10b determines (at block 232) whether there is a pending send/receive task for the link 20a, 20b, 20c being checked. If not, then control ends. If so, then the I/O manager 10a, 10b determines (at block 234) whether an elapsed time since data was sent/received on the link (current time minus the receive 64/send 74 time) exceeds a degraded timeout value. If so, then the state 54 of the link 20a, 20b, 20c is set (at block 236) to degraded. Otherwise, if the link is not determined to be degraded, control ends The degraded timeout value may comprise a time period commensurate with a network, such that if data has not been sent/received within this timeout period, then a network protocol operation is likely performing a timeout function.

The operations described in FIGS. 5 and 6 may be performed periodically by send and receive tasks of the I/O manager 10a, 10b or performed when updating the throughput or at other instances, such as before selecting a link as in FIG. 5.

In certain embodiments, an administrator, user or program may be able to update the elapsed time threshold, degraded timeout value, and other thresholds during operations or at initialization.

Figure 7:
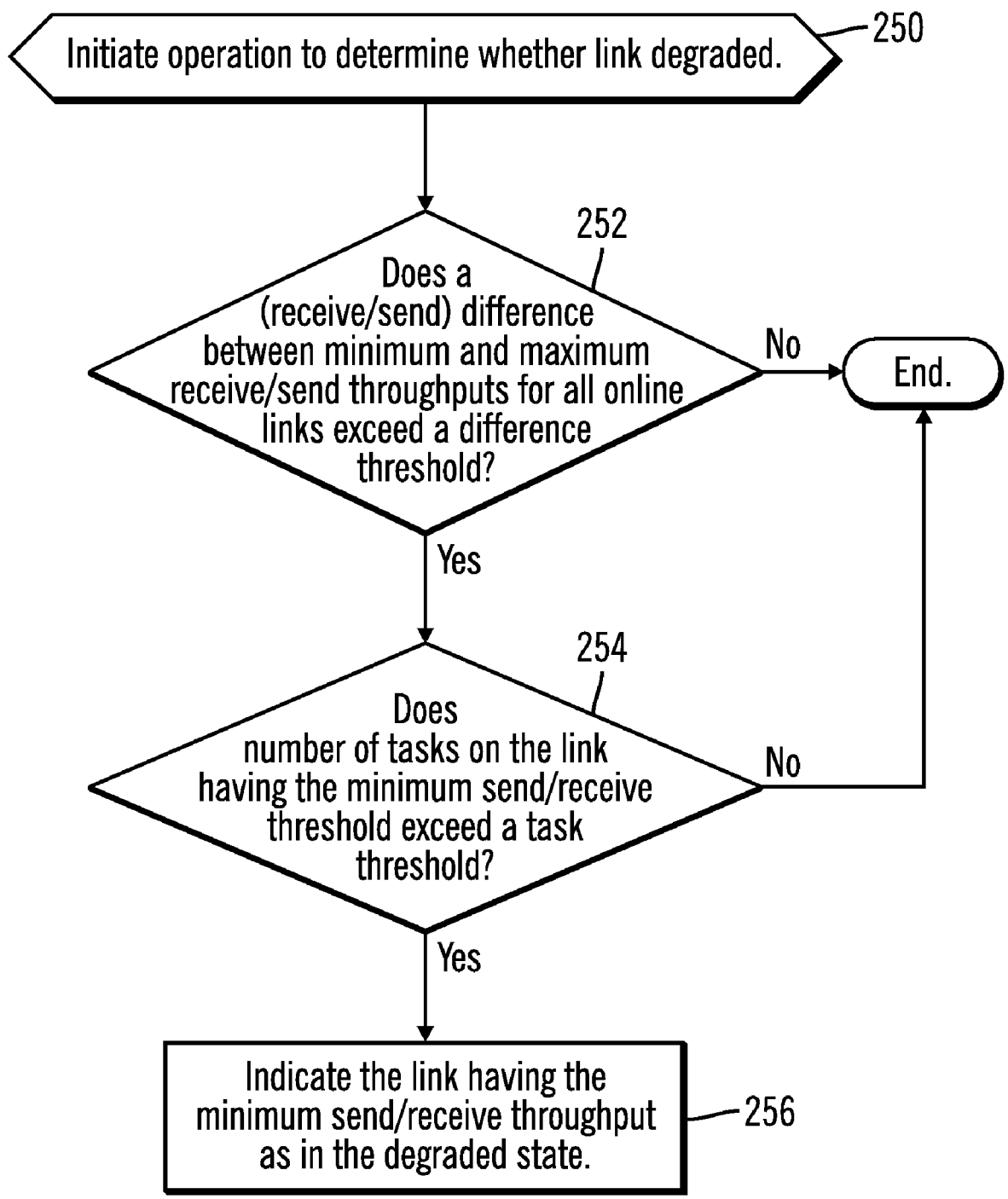

In certain embodiments, an adapter 16a, 16b, 16c, 20a, 20b, 20c on a node 2a, 2b may be connected to multiple nodes. In such case, the link information 12a, 12b for the node whose adapter is connected to multiple nodes would maintain performance information for the links to different target nodes that use the same adapter. Further, the performance on a link for that adapter to one node may be impacted by activity on a link from the same adapter to another node. FIG. 7 illustrates an additional embodiment of operations performed by the I/O manager 10a, 10b to send and receive tasks to determine whether an online link is degraded and is applicable to the situation where multiple target nodes connected to one adapter may impact performance at that adapter.

With respect to FIG. 7, upon initiating (at block 250) the operation to determine a degraded link, the I/O manager 10a, 10b determines (at block 252) whether a (receive/send) difference between minimum and maximum receive 58/send 68 throughputs for all online links exceeds a difference threshold. This threshold indicates whether the minimum receive 58/send 68 throughput is sufficiently less from the maximum throughput that the link having the minimum throughput may be degraded. If (at block 252) the minimum receive 58/send 68 throughputs exceeds a the receive/send threshold, then the I/O manager 10a, 10b determines (at block 254) whether a number of receive 66/send 76 tasks on the link 20a, 20b, 20c having the minimum send/receive threshold and the link having the maximum send/receive threshold exceed a task threshold. If the task difference does not exceed the task threshold, then the link having the minimum receive 58/send 68 throughput as in the degraded state and control ends. If the difference threshold is not exceeded (at block 252) or the task difference exceeds the threshold (at block 254), then control ends.

The test at block 254 determines whether the difference between the number of tasks on the links having the minimum and maximum throughput exceeds the threshold, and if so, then the link having the maximum throughput may be in a startup/rampdown timing window where tasks on a link have finished processing and new tasks have not yet started. Thus, the link having the maximum throughput may be high due to being in this startup/rampdown window. In such case, the receive/send difference is high because the link having the maximum throughput reflects the fact that there are few tasks, not that the link having the minimum throughput is degraded.

In a further embodiment, when selecting one link for a receive operation, the I/O manager initially selects one of the links 20a, 20b, 20c to use to connect to the target (sending) node to determine a size of the data to receive from the sending node. The receive throughput 58 of the initially selected link may be weighted higher, wherein selecting one of the links to the sending node to send the data to receive may further comprise weighting the receive throughput 58 of the initially selected link to make it a higher value. The weighted receive throughput 58 of the initially selected link is compared to the receive throughput 58 of the at least one of the online links not comprising the initially selected link to select the link having the highest receive throughput. In this way, the receive throughput of the initially selected link is weighted higher to favor selection of the initially selected link to use to receive the data to avoid the time required to switch from the currently used initially selected link and the link selected to receive the data.

With the described embodiments, the nodes may independently calculate and monitor numerous statistics pertaining to link throughput performance and use this information to detect and report less capable communication links and to dynamically balance workload between multiple communication links in a manner that is hardware independent and that does not require any additional messaging overhead. The described embodiments may account for the full duplex capability of communication hardware by treating a communication link as a logical send and receive channel. Further, the described embodiments may perform instantaneous throughput calculations and track the bytes queued for transfer on both the send and receive channels of a communication system that allows for automatic and dynamic adjusting of data transfer workloads for sending and receiving data in response to link performance fluctuations in order to maximize data transfer throughput. The described embodiments may further predict potential link throughput by using the instantaneous throughput and bytes queued values coupled with the size of the data that is to be transferred by the new task to further optimize throughput. Further, the described embodiments may check for degraded links by predicting potential link errors, such as network transmission errors and time-outs, e.g., TCP/IP stack exhausting retry time-outs, and report errors back to the application, thus saving critical time which is used to increase throughput.

Further, the link information about data transfer activity may be provided to the customer, including the number of send and receive data transfer tasks on each link, the number of send and receive bytes queued to transfer on a link, the send and receive instantaneous throughput, and the last time the link was used. The link information may be used to detect, isolate and report multi-directional degraded link performance conditions of links in the system to aid in performance troubleshooting. Further, because each node may separately and independently gather link information, certain embodiments may not require a centralized source to store link information.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable storage medium", where a processor may read and execute the code from the computer storage readable medium. A computer readable storage medium may comprise storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The "article of manufacture" may comprise a transmitting station and/or a receiving station for transmitting and receiving transmission signals in which the code or logic is encoded, where the code or logic encoded in the transmission signal may be decoded and stored in hardware or a computer readable storage medium at the receiving and transmitting stations or devices. An "article of manufacture" comprises a computer readable storage medium, hardware device, and/or transmission transmitters or receivers in which code or logic may be implemented. Those skilled in the art will recognize that many modifications may be made to this configuration without departing from the scope of the present invention, and that the article of manufacture may comprise suitable information bearing medium known in the art.

In certain embodiments, the operations are described as performed by an I/O manager 10a, 10b executed by in the node operating system independent of the adapter hardware. In an alternative embodiment, the described operations may be performed by the adapter hardware.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The use of variable references, such as "n" or "m", etc., to denote a number of instances of an item may refer to any integer number of instances of the item, where different variables may comprise the same number or different numbers. Further, a same variable reference used with different elements may denote a same or different number of instances of those elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    maintaining link information for a plurality of links to at least one target node indicating for each link a send throughput indicating a throughput for sending data on the link for send tasks queued on the link to send data on the link to a receiving node, a receive throughput indicating a throughput for receiving data on the link for receive tasks queued on the link to receive data on the link from a sending node, a state of the link indicating whether the link is online, offline or degraded;

processing a send operation to transfer data to a receiving node comprising one of the target nodes;

determining the states of the links to the receiving node in response to the send operation;

processing the send throughput of the links, as part of processing of the send operation, having the online state to select one of the links to the receiving node in response to determining that more than one of the links has the online state;

sending the data of the send operation using the selected link to the receiving node;

processing a receive operation to access data from a sending node comprising one of the target nodes;

determining the state of the links to the sending node in response to the receive operation;

processing the receive throughput to select one of the links having the online state, as part of processing of the receive operation, to the sending node in response to determining that more than one of the links has the online state; and receiving the data of the receive operation using the selected link to the sending node.

2. The method of claim 1, wherein processing the send throughput to select one of the online links comprises selecting the online link having the highest send throughput and wherein processing the receive throughput to select one of the online links comprises selecting the online link having the highest receive throughput.

3. The method of claim 1, wherein the link information indicates a number of receiving and sending tasks pending at each link, wherein selecting one of the links to the receiving node having the online state comprises determining the link having a shortest time to drain queued receive data at the receive throughput, wherein selecting one of the links to the sending node having the online state comprises determining the link having the shortest time to drain queued send data at the send throughput.

4. The method of claim 3, wherein determining the sending or receive shortest time to drain queued data comprises summing pending bytes to send or receive on the link plus new bytes to send or receive divided by the send or receive throughput.

5. The method of claim 1, wherein the receive throughput is updated in response to receiving data and if an elapsed time threshold has elapsed since the receive throughput was last updated, and wherein the send throughput is updated in response to sending data and if the elapsed time threshold has elapsed since the send throughput was last updated.

6. The method of claim 1, further comprising:
selecting one of the links to the sending or receiving node having the degraded state in response to determining that all the links have the degraded state; and
selecting one link having the online state in response to determining that only one link has the online state.

7. The method of claim 1, further comprising:
determining whether an elapsed time since data was transferred through a link exceeds a degradation timeout value in response to determining a send or receive task pending on the link; and
indicating that the link is degraded in response to determining that the time since data was transferred exceeds the degradation timeout value.

8. The method of claim 7, wherein determining whether a time since data was transferred through a link exceeds a degradation timeout value comprises:
maintaining in the link information for each link a receive time indicating a time the receive throughput was last updated and a send time indicating a time the send throughput was last updated; and
determining whether the elapsed time since the receive time or send time exceeds the degradation timeout value.

9. The method of claim 1, further comprising:
determining a degraded link comprising one of the links in the degraded state;
determining whether an elapsed time from when the state of the degraded link last changed exceeds a timeout value; and
indicating the state of the degraded link as the online state in response to determining that the elapsed time exceeds the timeout value.

10. The method of claim 1, further comprising:
determining a sending difference of a minimum and maximum send throughputs for the links having the online state;
determining whether the sending difference exceeds a threshold;
indicating the link having the minimum send throughput as having the degraded state in response to determining that the sending difference exceeds the threshold;
determining a receiving difference of a minimum and maximum receive throughputs for the links;
determining whether the receiving difference exceeds the threshold;
indicating the link having the minimum receive throughput as having the degraded state in response to determining that the sending difference exceeds the threshold.

11. The method of claim 10, further comprising:
determining whether a number of tasks on the link having the minimum and maximum send throughputs exceeds a task threshold, wherein the link having the minimum send throughput is indicated as in the degraded state in response to determining that the send task difference does not exceed the threshold;
determining a receive task difference of a number of tasks of the link having the minimum and maximum receive throughputs; and
determining whether the receive task difference exceeds the task threshold, wherein the link having the minimum receive throughput is indicated as in the degraded state in response to determining that the receive task difference does not exceed the threshold.

12. The method of claim 1, wherein processing the receive operation further comprises initially selecting one of the links to use to connect to the sending node to determine a size of the data to receive from the sending node, wherein selecting one of the links to the sending node to receive the data further comprises:
weighting higher the receive throughput of the initially selected link, wherein the weighted receive throughput of the initially selected link is compared to the receive throughput of at least one of the online links not comprising the initially selected link to select the link having the highest receive throughput.

13. A system in communication with a target node via a plurality of links, comprising:
a storage maintaining link information for a plurality of links to at least one target node indicating for each link a send throughput indicating a throughput for sending data on the link for send tasks queued on the link to send data on the link to a receiving node, a receive throughput indicating a throughput for receiving data on the link for receive tasks queued on the link to receive data on the link from a sending node, a state of the link indicating whether the link is online, offline or degraded;

an I/O manager for performing operations, the operations comprising:

processing a send operation to transfer data to a receiving node comprising one of the target nodes;

determining the states of the links to the receiving node in response to the send operation;

processing the send throughput of the links, as part of processing of the send operation, having the online state to select one of the links to the receiving node in response to determining that more than one of the links has the online state;

sending the data of the send operation using the selected link to the receiving node;

processing a receive operation to access data from a sending node comprising one of the target nodes;

determining the state of the links to the sending node in response to the receive operation;

processing the receive throughput to select one of the links having the online state, as part of processing of the receive operation, to the sending node in response to determining that more than one of the links has the online state; and receiving the data of the receive operation using the selected link to the sending node.

14. The system of claim 13, wherein the link information indicates a number of receiving and sending tasks pending at each link, wherein selecting one of the links to the receiving node having the online state comprises determining the link having a shortest time to drain queued receive data at the receive throughput and wherein selecting one of the links to the sending node having the online state comprises determining the link having a shortest time to drain queued send data at the throughput.

15. The system of claim 13, wherein the operations further comprise:

selecting one of the links to the sending or receiving node having the degraded state in response to determining that all the links have the degraded state; and selecting one link having the online state in response to determining that only one link has the online state.

16. The system of claim 13, wherein the operations further comprise:

determining a sending difference of a minimum and maximum send throughputs for the links having the online state;

determining whether the sending difference exceeds a threshold;

indicating the link having the minimum send throughput as having the degraded state in response to determining that the sending difference exceeds the threshold;

determining a receiving difference of a minimum and maximum receive throughputs for the links;

determining whether the receiving difference exceeds the threshold; and indicating the link having the minimum receive throughput as having the degraded state in response to determining that the sending difference exceeds the threshold.

17. An article of manufacture including code executed to cause communication with a target node via a plurality of links, wherein the code causes operations, the operations comprising:

maintaining link information for a plurality of links to at least one target node indicating for each link a send throughput indicating a throughput for sending data on the link for send tasks queued on the link to send data on the link to a receiving node, a receive throughput indicating a throughput for receiving data on the link for receive tasks queued on the link to receive data on the link from a sending node, a state of the link indicating whether the link is online, offline or degraded;

processing a send operation to transfer data to a receiving node comprising one of the target nodes;

determining the states of the links to the receiving node in response to the send operation;

processing the send throughput of the links, as part of processing of the send operation, having the online state to select one of the links to the receiving node in response to determining that more than one of the links has the online state;

sending the data of the send operation using the selected link to the receiving node;

processing a receive operation to access data from a sending node comprising one of the target nodes;

determining the state of the links to the sending node in response to the receive operation;

processing the receive throughput to select one of the links having the online state, as part of processing of the receive operation, to the sending node in response to determining that more than one of the links has the online state; and receiving the data of the receive operation using the selected link to the sending node.

18. The article of manufacture of claim 17, wherein the link information indicates a number of receiving and sending tasks pending at each link, wherein selecting one of the links to the receiving node having the online state comprises determining the link having a shortest time to drain queued receive data at the receive throughput, wherein selecting one of the links to the sending node having the online state comprises determining the link having a shortest time to drain queued send data at the send throughput.

19. The article of manufacture of claim 17, further comprising:

selecting one of the links to the sending or receiving node having the degraded state in response to determining that all the links have the degraded state; and selecting one link having the online state in response to determining that only one link has the online state.

20. The article of manufacture of claim 17, further comprising:

determining a sending difference of a minimum and maximum send throughputs for the links having the online state;

determining whether the sending difference exceeds a threshold;

indicating the link having the minimum send throughput as having the degraded state in response to determining that the sending difference exceeds the threshold;

determining a receiving difference of a minimum and maximum receive throughputs for the links;

determining whether the receiving difference exceeds the threshold;

indicating the link having the minimum receive throughput as having the degraded state in response to determining that the sending difference exceeds the threshold.

* * * * *